United States Patent [19]

Ho et al.

[11] Patent Number: 4,514,517

[45] Date of Patent: Apr. 30, 1985

[54] SUPPORTED, SELF-PROMOTED MOLYBDENUM AND TUNGSTEN SULFIDE CATALYSTS FORMED FROM BIS(TETRATHIOMETALLATE) PRECURSORS, AND THEIR PREPARATION

[75] Inventors: Teh C. Ho, Scotch Plains; Wie-Hin Pan, Fanwood, both of N.J.

[73] Assignee: Exxon Research and Engineering Co., Florham Park, N.J.

[21] Appl. No.: 518,360

[22] Filed: Jul. 29, 1983

[51] Int. Cl.$^3$ .................. B01J 27/02; B01J 31/12
[52] U.S. Cl. .................... 502/220; 502/221; 502/164
[58] Field of Search ............ 502/164, 220, 221

[56] References Cited

U.S. PATENT DOCUMENTS

| | | | |
|---|---|---|---|
| 2,192,125 | 2/1939 | Brown et al. | 502/220 X |
| 2,595,772 | 5/1952 | Daussat et al. | 252/439 |
| 2,891,003 | 6/1959 | Chervenak et al. | 208/216 |
| 2,914,462 | 11/1959 | Hemminger | 208/143 X |
| 3,074,783 | 1/1963 | Paull | 423/437 |
| 3,116,234 | 12/1963 | Douwes et al. | 208/208 R |
| 3,148,135 | 9/1964 | Schlinger et al. | 208/58 |
| 3,159,688 | 12/1964 | Jennings et al. | 260/680 |
| 3,167,496 | 1/1965 | Solomon | 502/220 |
| 3,245,903 | 4/1966 | Champagnat | 208/216 X |
| 3,265,613 | 8/1966 | Garwood | 208/254 H X |
| 3,459,656 | 8/1969 | Rausch | 208/57 |
| 4,151,190 | 4/1979 | Murchison et al. | 252/439 |
| 4,243,553 | 1/1981 | Naumann et al. | 252/439 |
| 4,243,554 | 1/1981 | Naumann et al. | 252/439 |

OTHER PUBLICATIONS

Hydrodesulfurization Cat. Prep. from X(MS$_4$)$_2{}^{2-}$ Thioheteroanions Containing Ni or Co and Mo or W: Correlation of ESR Signal Intensity with Thiophene Conversion, Konings et al., Journal of Catalysis, vol. 76, No. 2, Aug. 1982, pp. 466–472.

Primary Examiner—William G. Wright
Attorney, Agent, or Firm—Edward M. Corcoran

[57] ABSTRACT

Hydrocarbon feeds are upgraded by contacting a feed, at an elevated temperature and in the presence of hydrogen, with a supported, self-promoted catalyst formed by compositing a porous, refractory inorganic oxide, support with one or more complex salts selected from the group consisting of (NR$_4$)$_2$[M(WS$_4$)$_2$], (NR$_4$)$_x$[M(MoS$_4$)$_2$] and mixtures thereof wherein R is one or more alkyl groups, aryl groups or mixture thereof, wherein promoter metal M is covalently bound in the anion and is Ni, Co or Fe and wherein x is 2 if M is Ni and x is 3 if M is Co or Fe and heating said composite in a non-oxidizing atmosphere in the presence of sulfur and hydrogen and a hydrocarbon to form said supported catalyst.

19 Claims, No Drawings

SUPPORTED, SELF-PROMOTED MOLYBDENUM AND TUNGSTEN SULFIDE CATALYSTS FORMED FROM BIS(TETRATHIOMETALLATE) PRECURSORS, AND THEIR PREPARATION

BACKGROUND OF THE INVENTION

1. Field of the Invention

This invention relates to a process for the preparation of supported, self-promoted molybdenum sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating a composite of a support and one or more molybdenum and/or tungsten bis(tetrathiometallate) catalyst precursor compounds containing the promoter metal as part of the precursor molecule in the presence of sulfur at elevated temperature for a time sufficient to form said self-promoted catalyst.

2. Background of the Disclosure

The petroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrorefining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrotreating. Carbon yield is reduced, and gasoline yield is generally increased. In the hydrodesulfurization of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation, to some degree, also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree, also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks, emphasis is on the removal of nitrogen from the feedstock. Although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydro-treating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc., reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from 300°–800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553 a substituted ammonium thiomolybdate salt is thermally decomposed at a very slot heating rate of from about 0.5° to 2° C./min. The processes disclosed in these patents are claimed to produce molybdenum disulfide catalysts having superior properties for water shift and methanation reactions and for catalyzed hydrogenation or hydrotreating reactions.

Catalysts comprising molybdenum sulfide in combination with other metal sulfides are also known. Thus, U.S. Pat. No. 2,891,003 discloses an iron-chromium combination for desulfurizing olefinic gasoline fractions; U.S. pat. No. 3,116,234 discloses Cr-Mo and also Mo with Fe and/or Cr and/or Ni for HDS; U.S. Pat. No. 3,265,615 discloses Cr-Mo for HDN and HDS; U.S. Pat. No. 3,245,903 discloses Fe-Mo and Fe-Co-Mo for lube oil refining; U.S. Pat. No. 3,459,656 discloses Ni-Co-Mo for HDS; U.S. Pat. No. 4,108,761 discloses Fe- Ni-Mo for HDN and U.S. Pat. No. 4,171,258 discloses Fe-Cr-Mo for HDS with steam.

SUMMARY OF THE INVENTION

The present invention relates to hydroprocessing processes comprising contacting a hydrocarbon feed, at elevated temperature and in the presence of hydrogen, with a supported, self-promoted catalyst obtained by heating a composite of a porous, inorganic refractory support and one or more carbon-containing, bis(tetrathiometallate precursor salts selected from the group consisting of $(NR_4)_2[M(WS_4)_2]$, $(NR_4)_x[M(MoS_4)_2]$ and mixtures thereof, in a non-oxidizing atmosphere in the presence of sulfur and hydrogen at a temperature above about 150° C. for a time sufficient to form said catalyst, wherein ($NR_4$) is a carbon-containing, substituted ammonium cation and R is selected from the group consisting of (a) alkyl groups, aryl groups and mixture thereof and (b) mixtures of (a) with hydrogen, wherein promoter metal M is covalently bound in the anion and is Ni, Co or Fe and wherein x is 2 if M is Ni and x is 3 if M is Co or Fe. In a preferred embodiment, substituted ammonium cation ($NR_4$) will contain only alkyl groups and the support will comprise alumina. It is also preferred to form the catalyst in the presence of a hydrocarbon. Self-promoted means a promoted catalyst formed from a precursor of this invention wherein the promoter metal is covalently bound in the anion of the precursor salt as explained below.

Hydroprocessing processes is meant to include any process that is carried out in the presence of hydrogen including, but not limited to, hydrocracking, hydrodenitrogenation, hydrodesulfurization, hydrogenation of aromatic and aliphatic unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions.

DETAILED DESCRIPTION OF THE INVENTION

The precise nature and composition of the catalyst species that is formed as a result of heating up the composite of precursor salt and support in the presence of sulfur and hydrogen is not known. The surface composition or composition deposited on the surface of the support is believed to correspond generally with the unsupported catalyst species defined in Application Serial Nos. 518,361 and 518,363, each jointly filed by Edward I. Stiefel, Wie-Hin Pan and Russell R. Chianelli of even date herewith. Unlike Applicants' species, however, the catalyst species of Stiefel, Pan and Chianelli are unsupported, bulk catalysts. They thus differ from the supported, self-promoted molybdenum and tungsten catalyst species defined herein; and differ substantially, inter alia, in that the catalyst species of this invention achieve superior utilization of the catalytic metals present on the catalyst.

In one method of preparing the supported catalyst species of this invention, a solution of precursor salt, or mixture of salts, is incorporated with a pre-selected quantity of porous, refractory inorganic oxide support material, preferably a particulate mass of said support, with the salt-containing support then dried to remove all or a portion of the solvent from the support, and the dried, particulate, salt-containing support then heated in a non-oxidizing atmosphere in the presence of sulfur or sulfur-bearing compound and hydrogen at elevated temperature to form the catalyst species of this invention. Suitably, sufficient amounts of the salt, or salts, is incorporated on the support so that prior to, or at the time that the composition of support and precursor salt or salts is heated in the presence of sulfur and hydrogen, preferably from about 10 weight percent to about 25 weight percent of the salt, expressed as weight of $Mo_3$ or $WO_3$ on an ignition loss free basis, will be present on the support. The supported catalyst species of this invention are stable, highly active and selective as hydrotreating catalysts.

The precursor salt or mixture of salts is composited or otherwise intimately associated with the porous, inorganic oxide support by various techniques well-known to those skilled in the art, such as coprecipitation, impregnation or the like. The composite is preferably formed from a solution of the desired precursor salt, or salts by impregnation of the support, typically via an "incipient wetness" technique which requires a minimum of solution so that the total solution with the preselected desired amount of the catalyst precursor salt is adsorbed, initially or after some evaporation. Alternatively, in some cases it may be found that the precursor salts useful for forming the supported catalyst species of this invention have limited solubility in both non-aqueous and mixed aqueous/non-aqueous media so that multiple impregnation of the support material with the precursor salt solution is necessary. In this case, it will be necessary to dry most or at least a major portion of the solvent between each impregnation. In any event, the precursor salt-containing particulate material can thereafter be heated and dried at low temperature, with or without vacuum assistance, e.g., at temperatures ranging at or below the boiling temperature of the solvent. Typically, a particulate porous refractory inorganic oxide, notably alumina, in the form of beads, pills, pellets, sieved particles, extrudates, or the like in dry or solvated state is contacted with a solution of the precursor salt or mixture of precursor salts with the result that the salt solution is adsorbed into the particulate material in the desired amount. Alternatively, a supported catalyst species of this invention has been formed by forming the precursor salt in the presence of a slurry of support material.

The preferred support for the catalyst species of this invention is alumina, and the composite support can contain for example, one or more of alumina, bentonite, clay, diatomaceous earth, zeolite, silica, activated carbon, magnesia, zirconia, boria, titania and the like, these latter with alumina, usually in a range of from about 1 to 20 weight percent, based on the weight of the support. A preferred support for the practice of the present invention is one having a surface area of more than 50 $m^2/g$, preferably from about 100 to about 300 $m^2/g$.

As hereinbefore stated, the catalyst precursor salt will be one or more carbon containing bis(tetrathiomolybdate) or bis(tetrathiotungstate) compounds of the formula $(NR_4)_2[M(WS_4)_2]$ or $(NR_4)_x[M(MoS_4)_2]$ wherein the promoter metal M is covalently bound in the anion and is Ni, Co or Fe and wherein x is 2 if M is Ni and x is 3 if M is Co or Fe. As hereinbefore stated, R is a proton, an alkyl group, an aryl group or mixture thereof and preferably one or more alkyl groups. These bis(tetrathiometallate) anions have the structure

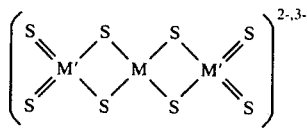

wherein M' is either Mo or W, and the promoter metal M is tetracoordinated with four sulfur atoms with each of the two tetrathiometallate groups providing two of the said four sulfur atoms. Thus, it will be appreciated that the charge, 2− or 3−, on the bis(tetrathiometallate) anion will depend on the charge or oxidation state of the promoter metal M. The bis(tetrathiotungstate) and bis(tetrathiomolybdate) anions, $[M(WS_4)_2]$ and $[M(MoS_4)_2]$, will have a charge of 2− when the oxidation state of the promoter metal M is 2+. In contrast, they will have a charge of 3− if the oxidation state of promoter metal is 1+.

The precursor salts useful in this invention may be prepared in both non-aqueous media and mixed aqueous/non-aqueous media. With the exception of compounds containing the cobalt bis(tetrathiomolybdate) trianion, many compounds useful as catalyst precursors in this invention and the methods used to prepare them may be found in an article by Callahan and Piliero titled "Complexes of $d^8$ Metals with Tetrathiomolybdate and Tetrathiotungstate Ions. Synthesis, Spectroscopy and Electrochemistry," Inorg. Chem., 19, n.9, 2619–2629 (1980) and in a review article by A. Muller et al in Chem. Rev. 104, 975 (1971), the disclosures of which are incorporated herein by reference.

Except for compounds containing the cobalt bis(tetrathiomolybdate) anion, compounds useful as catalyst precursor salts in the practice of this invention may be prepared, for example, in mixed aqueous/non-aqueous media such as an equal volume mixture of water and acetonitrile. Thus, one may form separate solutions of a simple salt of the promoter metal (i.e., a halide, sulfate, etc.) and an ammonium thiotungstate or thiomolybdate in the mixed media. These solutions will then be mixed, preferably at relatively low temperature and under anaerobic conditions. A salt of a suitable cation (i.e., $NR_4Cl$) may be added to the promoter salt solution or to the mixture of promoter metal salt and ammonium thiometallate. The catalyst precursor $(NR_4)_x[M(M'S_4)_2]$ precipitates out of solution. The catalyst precursor compounds useful in this invention are stable in the presence of oxygen or air if they are kept dry, except for the $(NR_4)_3[Fe(MoS_4)_2]$ and $(NR_4)_3[Co(MoS_4)_2]$ precursor compounds which should be kept both dry and under anaerobic conditions.

Compounds of the formula $(NR_4)_3[Co(MoS_4)_2]$ containing the cobalt bis(tetrathiomolybdate) trianion $[Co(MoS_4)_2]^{3-}$ of the structure set forth above wherein the cobalt is in the 1+ oxidation state have been prepared in non-aqueous media using mono, di and trivalent cobalt containing compounds. If the cobalt in the cobalt containing starting material is in the monovalent or 1+ oxidation state, a reducing agent need not be present in the reaction media. However, a non-oxidizing environment is essential to form the trianion in significant amounts irrespective of whether the cobalt in the starting material is in the mono, di or trivalent state. These compounds are preferably formed under anaerobic conditions. Illustrative, but non-limiting examples of monovalent cobalt starting materials useful for forming compounds containing the trianion $[Co(MoS_4)_2]^{3-}$ include cyclopentadienyl cobalt dicarbonyl-$(C_5H_5)Co(CO)_2$, hydridocobalt tetracarbonyl-$HCo(CO)_4$ and cyclopentadienyl cobalt cycloctatetraene-$(CH_5H_5)Co(C_8H_8)$.

When using a cobalt containing starting material wherein the cobalt is di or trivalent, it is necessary for the cobalt to be converted to the monovalent form during the reaction in order for the product to be formed. The conversion into the monovalent cobalt form can be effected by the presence of sufficient reducing agent in the reaction medium. The reducing agent may be added to the reaction medium or it may be part of the cobalt containing compound used as one of the starting materials.

When a compound containing a divalent or trivalent cobalt atom is used as a starting material, it is necessary for the cobalt to be converted to the monovalent form during the formation of the bis(tetrathiomolybdate) trianion. The following reaction sequence illustrates the formation of $(NR_4)_3[Co(MoS_4)_2]$ from $CoCl_2$ and $(NR_4)_3(MoS_4)$ in the presence of a reducing agent such as an organic thiolate, $SR^-$, wherein R is hydrogen, an alkyl, an aryl group, or mixture thereof and preferably an alkyl group.

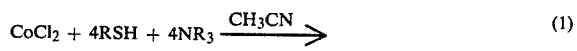

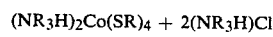

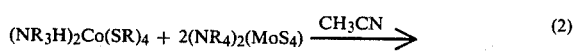

Thus when the simple salt $CoCl_2$, where the cobalt is divalent, is used as a starting material, it is first reacted with a thiolate reagent, $SR^-$, to form the anion $Co(SR)_4^{2-}$. The thiolate reagent $SR^-$ is generated by reacting the thiol RSH with a base. Although any base may be used, such as NaOH, it is preferred to use a nitrogen containing organic base such as pyridine, or a primary, secondary or tertiary amine. In equation (1) above, the base is a trialkylamine. Although only a stoichiometric amount of reducing agent $SR^-$ is needed to effect the reduction from $Co^{2+}$ to $Co^{1+}$, it is preferred to use an excess of reducing agent. The solution containing the anion $Co(SR)_4^{2-}$ is then added to the $(NR_4)_2MoS_4$, partially dissolved in $CH_3CN$ (eq. 2). After a period of 30 to 60 minutes, the reaction is complete. Since the product $(NR_4)_3[Co(MoS_4)_2]$ is the least soluble in the reaction mixture, it can be readily precipitated out of the solution by adding diethylether to the reaction mixture.

When the cobalt starting material already contains the reducing agent bonded to it, for example $Co(S_2CNR'_2)_3$, it can be directly reacted with $(NH_4)_2MoS_4$. Equation 3 illustrates this reaction wherein R' is alkyl, aryl or mixture thereof and preferably alkyl.

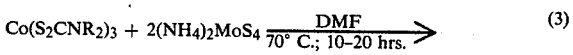

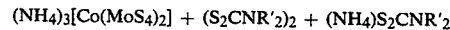

In this example, the cobalt starting material has cobalt in the trivalent state. Three equivalents of the reducing agent, N,N-dialkyl dithiocarbamate, $S_2CNR'_2{}^-$, are coordinated with the Co$^{3+}$. In this reaction, N,N-dimethylformamide is the preferred solvent. Further, this reaction requires heating at 70° C. and at least 10 hours for the reaction to give significant yield of the product. The reducing agent gets oxidized to tetraalkylthiuramdisulfide (S$_2$CNR'$_2$)$_2$ as the Co$^{3+}$ gets converted to Co$^{1+}$. Examples of other reducing agents that are capable of coordinating with cobalt include alkyl or aryl xanthates (S$_2$COR'$^-$), o,o-dialkyldithiophosphates (S$_2$P(OR')$_2$$^-$), dialkyldithiophosphinates (S$_2$PR'$_2$$^-$) or thiolates (SR'$^-$).

It should be understood that other reducing agents such as dithionite salts, borohydride salts, hydrazines, etc., can be used as the reductant in this synthesis route when other cobalt 2+ or 3+ compounds or complexes are used as the cobalt starting material. These include complex ions in which N, O, S or P are coordinated to the cobalt atom. Illustrative, but non-limiting examples of other suitable cobalt 2+ and 3+ compounds and complexes include salts of Co(amine)$_6$$^{2+,3+}$, Co(acetylacetonate)$_3$, salts of [Co(NH$_3$)$_5$Cl]$^{2+}$, etc.

The cobalt bis(tetrathiomolybdate) trianion compounds prepared as above were analyzed using a variety of analytical techniques. Thus, elemental analysis was done by using combustion analysis for carbon, nitrogen, hydrogen and sulfur while atomic absorption spectroscopy was used to analyze for the metals. Infrared and electronic absorption spectroscopy were also employed as well as magnetic susceptibility and X-ray powder diffraction spectroscopy. In the infra-red region, characteristic bands of the trianion of this invention, Co(MoS$_4$)$_2$$^{3-}$, were observed at 481 cm$^{-1}$, 466 cm$^{-1}$ and at 445 cm$^{-1}$. In the ultravioletvisible—near infra-red region, a N,N-dimethylformamide solution of the (NR$_4$)$^+$ salt (wherein R was C$_2$H$_5$) displayed peaks at 825 nm, (400), 645 nm (6,600), 545 nm (5,300), 453 nm (sh) and 349 nm (19,500). The parenthetical numbers are molecular extinction coefficients in units of liter mole$^{-1}$ cm$^{-1}$. The complex (NR$_4$)[Co(MoS$_4$)$_2$] wherein R=C$_2$H$_5$ displayed a magnetic moment of 3.3 BM as determined by the Evans NMR method.

Inasmuch as compounds containing the cobalt bis(tetrathiomolybdate) trianion are sensitive to oxygen, they must be maintained under non-oxidizing and preferably anaerobic conditions.

The catalysts of this invention may be prepared by heating a composite of one or more catalyst precursor salts and support material, in the presence of sulfur and hydrogen and at a temperature of from about 150°–600° C. for a time sufficient to form the catalyst. Preferably, the temperature will range from about 200°–500° C. and more preferably from about 300°–400° C. In a preferred embodiment the catalyst will be formed in the presence of a hydrocarbon, in addition to sulfur and hydrogen.

The sulfur required for the formation of the catalyst from the composite of the precursor salt and support should be present in an amount at least sufficient to achieve the desired stoichiometry of the resulting catalyst. It should be noted that it is possible to make catalysts useful in the process of this invention using only the sulfur present in the precursor. However, it is preferred that additional sulfur be present during formation of the catalyst. This additional sulfur may be present as elemental sulfur or a sulfur-bearing compound other than the precursor. Preferably, sulfur will be present in the reaction zone in an amount in excess of the stoichiometrically required amount. The hydrogen required to form the catalyst may be present in the reaction as gaseous hydrogen, a hydrogen-bearing gas such as H$_2$S, one or more hydrogen donor hydrocarbons such as tetralin, or combination thereof.

In a preferred embodiment, the catalysts of this invention will be formed ex-situ or in situ in the presence of any hydrocrbon that is convenient, including a heavy hydrocarbon oil having at least 10 weight percent of material boiling above about 1050° F. at atmospheric pressure, such as various residua, whole and topped crude oils, etc. Thus, the catalysts of this invention may be formed in situ in a sulfur-bearing feed merely by contacting one or more suitable precursor compounds useful in forming the catalysts of this invention with the feed and hydrogen at a temperature above about 150° C. and preferably above about 200° C. After the catalyst has been formed in-situ, the catalyst will then act to remove sulfur from said feed if hydrogen is present therein. As previously stated, the hydrogen may be present in the feed as gaseous hydrogen, a hydrogen-bearing gas such as H$_2$S, one or more hydrogen donor hydrocarbons such as tetralin, or combination thereof.

As discussed under Background of the Disclosure, molybdenum and tungsten sulfide catalysts both bulk and supported, have many uses, including hydrotreating. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290°–550° C., or residuum containing from about 10 percent to about 50 percent of material boiling above about 575° C.

Finally, the catalysts of this invention are also useful for removing nitrogen from nitrogen-containing feedstocks. They are particularly useful for selectively removing nitrogen from a nitrogen and sulfur containing feed, such as a lube oil feed.

| Feed | | Temp., °C. | Pressure psig | Space Velocity V/V/Hr | Hydrogen Gas Rate SCF/B |
|---|---|---|---|---|---|
| Naptha | Typical | 100–370 | 150–800 | 0.5–10 | 100–2000 |
| Diesel Fuel | Typical | 200–400 | 250–1500 | 0.5–4 | 500–6000 |
| Heavy Gas Oil | Typical | 260–430 | 250–2500 | 0.3–2 | 1000–6000 |
| Lube Oil | Typical | 200–450 | 100–3000 | 0.2–5 | 100–10,000 |
| Residuum | Typical | 340–450 | 1000–5000 | 0.1–1 | 2000–10,000 |

The invention will be more readily understood by reference to the following examples.

EXAMPLES

In the following examples, supported catalyst species were prepared and were ground and pelletized to a 20/40 mesh size (Tyler) using a four percent aqueous solution of polyvinyl alcohol as a binder. The pelletized catalyst precursors were placed into a stainless steel reactor at 100° C. at atmospheric pressure where they were purged for one hour under nitrogen. Ten percent of hydrogen sulfide in hydrogen was introduced into the reactor at a space velocity of 0.75 SCF/hr for each 10 cc of catalyst in the reactor. The temperature in the reactor was then raised to 325° C. and kept at this temperature for three hours to form the catalyst after which the temperature in the reactor was lowered to 100° C., the $H_2S/H_2$ gas flow was stopped and the reactor was purged with nitrogen until room temperature was reached.

About 20 cc of each catalyst was loaded into a fixed-bed reactor made out of ⅜ inch 316 stainless steel pipe which was equipped with a calibrated feed burette pump, gas-liquid separator and liquid product collector The conditions in the reactor were as set forth below:
Temperature: 325° C.
Pressure: 3.15 MPa
Hydrogen rate: 3000 SCF/bbl
LHSV: 3.0

The liquid product was analyzed for total sulfur by X-ray fluorescence and for nitrogen by combustion analysis. The feedstock used was a light catalytic cycle oil (LCCO) that was about 20 wt.% paraffinic having properties set forth in Table 2.

TABLE 2

| LCCO Feed | |
|---|---|
| Gravity (°API) | 18.6 |
| Sulfur, wt. % | 1.5 |
| Nitrogen, ppm | 370 |
| GC distillation | |
| Wt. % | Temp., °C. |
| 5 | 231 |
| 10 | 251 |
| 50 | 293 |
| 70 | 321 |
| 90 | 352 |
| 95 | 364 |

Hydrodesulfurization ($K_{HDS}$) and hydrodenitrogenitrogenation ($K_{HDN}$) rate constants for the respective reactions were calculated as follows:

$$K_{HDS} = \frac{LHSV}{S_f}\left(\frac{S_f}{S_p} - 1\right)$$

$$K_{HDN} = (LHSV)\ln\left(\frac{N_f}{N_p}\right)$$

wherein $S_f$ and $S_p$ are the weight percent of sulfur in the feed and product, respectively and $N_f$ and $N_p$ are the weight percent of nitrogen in the feed and product, respectively.

EXAMPLE 1

In this experiment ten grams of a $[N(C_3H_7)_4]_2$-Ni($MoS_4)_2$ precursor salt were impregnated onto 20 grams of a reforming grade of gamma alumina obtained from Norton. Impregnation was done using the pore-filling method. The precursor salt was dissolved in DMF and a total of four impregnations were used. First impregnation, 4.6 grams of the nickel molybdate was dissolved in 11.5 ml of DMF with this solution added dropwise to the alumina support. After each addition the resulting impregnate was dried in a vacuum oven overnight at about 50° C. The resulting impregnate was pelletized using the procedure set forth above and placed into the reactor to form the catalyst and then used to hydrotreat the light catalytic cycle oil feed. The results are set forth in the Table.

EXAMPLE 2

In this experiment 106 grams of colloidal alumina (20 weight percent alumina from Nyacol) was placed in a four neck flask and degassed from nitrogen. A mechanical stirrer was fitted in the middle neck and nitrogen was admitted in one of the side necks. The other two necks were fitted with addition funnels one of which contained 5.42 grams of ammonium thiomolybdate dissolved in 150 ml of $H_2O$ and the other contained 6.7 g of $[N(C_3H_7)_4]$ Br and 2.4 g of $NiCl_2.6H_2O$ in a mixture of 50 ml $H_2O$ and 35 ml $CH_3CN$. Both solutions were degassed with nitrogen.

Both solutions were simultaneously added to the colloidal alumina in the flask accompanied by vigorous stirring. The red color of the $[N(C_3H_7)_4]_2Ni(MoS_4)_2$ precursor salt formed and the colloid gradually gelled. The stirring rate was increased and as more of the reactant solutions were added the gel became liquid again. After addition of the reactants was complete, an opaque product having a red color was obtained. This product was dried in a vacuum oven at 53° C. for two days yielding a solid composite of precursor salt and alumina.

The dry composite was pelletized, etc. as above and placed in the reactor to form the supported catalyst species which was then used to hydrotreat the light catalytic cycle oil feed. The results are set forth in the Table.

EXAMPLE 3

In this experiment, two commercial HDS and HDN catalysts were sulfided and placed in the reactor to hydrotreat the LCCO feed. The catalysts comprised cobalt molybdate on $-Al_2O_3$ and nickel molybdate on $-Al_2O_3$. The cobalt molybdate catalyst comprised 12.5 percent molybdenum oxide and 3.5 percent cobalt oxide supported on the gamma alumina and the nickel molybdate comprised 18 percent molybdenum oxide and 3.5 percent nickel oxide on gamma alumina. These commercial catalysts were sulfided employing the same procedure used to form the catalysts of this invention, except that the temperature was 360° C. for one hour. The results are shown in the Table.

| HDS AND HDN ACTIVITIES OF CATALYSTS | | | |
|---|---|---|---|
| Catalyst | $K_{HDN}$ | $K_{HDS}$ | HDN Selectivity* |
| Example 1 | 0.86 | 6.0 | 14.3 |
| Example 2 | 0.61 | 4.6 | 13.2 |
| Cobalt molybdate on alumina (Example 3) | 0.55 | 10.7 | 5.14 |
| Nickel molybdate on alumina (Example 3) | 1.26 | 10.1 | 12.48 |

*HDN selectivity is defined as $\frac{K_{HDN}}{K_{HDS}} \times 100$

What is claimed is:
1. As a composition of matter, supported, self-promoted catalysts obtained by compositing a pre-selected quantity of porous, refractory inorganic oxide with one or more carbon-containing, bis(tetrathiometallate) precursor salts selected from the group consisting of $(NR_4)_2[M(WS_4)_2]$, $(NR_4)_x[M(MoS_4)_2]$ and mixtures thereof and heating said composite in a non-oxidizing atmosphere in the presence of sulfur and hydrogen at elevated temperature for a time sufficient to form said catalyst, wherein $(NR_4)$ is a carbon-containing, substi- tuted ammonium cation, wherein R is selected from the group consisting of (a) alkyl groups, aryl groups and mixture thereof and (b) mixture of (a) with hydrogen, wherein promoter metal M is covalently bound in the anion and is Ni, Co or Fe and wherein x is 2 if M is Ni and x is 3 if M is Co or Fe and wherein promoter metal M is tetracoordinated with four sulfur atoms with each of the two tetrathiometallate groups providing two of each of the said four sulfur atoms.

2. The composition of claim 1 formed in the presence of excess sulfur.

3. The composition of claim 2 wherein said elevated temperature is at least about 150° C.

4. The composition of claim 3 formed in the presence of a hydrocarbon.

5. The composition of claim 4 wherein at least a portion of excess sulfur is in the form of one or more sulfur-bearing hydrocarbons.

6. The composition of claim 5 wherein said support comprises alumina.

7. The composition of claim 6 wherein the substituted ammonium cation contains only alkyl groups.

8. The composition of claim 7 wherein said non-oxidizing atmosphere comprises a mixture of $H_2$ and $H_2S$.

9. The composition of claim 8 wherein said catalyst is formed at a temperature of at least about 200° C.

10. A process for forming a supported, self-promoted catalyst comprising the steps of:
(i) forming, in the presence of a slurry containing a pre-selected quantity of porous, refractory inorganic oxide support material, one or more carbon-containing bis(tetrathiometallate) precursor salts selected from the group consisting of $(NR_4)_2[M(WS_4)_2]$, $(NR_4)_x[M(MoS_4)_2]$ and mixtures thereof, wherein $(NR_4)$ is a carbon-containing, substituted ammonium cation, R is selected from the group consisting of (a) alkyl groups, aryl groups and mixtures thereof and (b) mixtures of (a) with hydrogen, wherein promoter metal M is covalently bound in the anion and is Ni, Co or Fe and wherein x is 2 if M is Ni and x is 3 if M is Co or Fe and wherein promoter metal M is tetracoordinated with four sulfur atoms with each of two tetrathiometallate groups providing two of each of the said four sulfur atoms;
(ii) drying the material formed in (i) to obtain a solid composite of precursor salt and support material; and
(iii) heating the composite formed in (ii) in a non-oxidizing atmosphere in the presence of sulfur and hydrogen at an elevated temperature of at least about 150° C. for a time sufficient to form said catalyst.

11. The process of claim 10 wherein at least a portion of said excess sulfur is in the form of one or more sulfur-bearing hydrocarbons.

12. The process of claim 11 wherein said catalyst is formed in the presence of a hydrocarbon.

13. The process of claim 12 wherein said support material comprises alumina.

14. The process of claim 13 wherein the substituted ammonium cation contains only alkyl groups.

15. A process for forming a supported, self-promoted catalyst comprising the steps of:
(i) forming, in the presence of a slurry containing a pre-selected quantity of colloidal sized particles of porous, refractory inorganic oxide support material, one or more carbon-containing bis(tetrathiometallate) precursor salts selected from the group consisting of $(NR_4)_2[M(WS_4)_2]$, $(NR_4)_x[M(MoS_4)_2]$ and mixtures thereof, wherein $(NR_4)$ is a carbon-containing, substituted ammonium cation, wherein R is selected from the group consisting of (a) aklyl groups, aryl groups and mixture thereof and (b) mixtures of (a) with hydrogen, wherein promoter metal M is covalently bound in the anion and is Ni, Co or Fe and wherein x is 2 if M is Ni and x is 3 if M is Co or Fe and wherein promoter metal M is tetracoordinated with four sulfur atoms with each of two tetrathiometallate groups providing two of each of the said four sulfur atoms;
(ii) drying the material formed in (i) to obtain a solid composite of precursor salt and support material; and
(iii) heating the composite formed in (ii) in a non-oxidizing atmosphere in the presence of sulfur and hydrogen at an elevated temperature of at least about 150° C. for a time sufficient to form said catalyst.

16. The process of claim 15 wherein at least a portion of said excess sulfur is in the form of one or more sulfur-bearing hydrocarbons.

17. The process of claim 16 wherein said catalyst is formed in the presence of a hydrocarbon.

18. The process of claim 17 wherein said support material comprises alumina.

19. The process of claim 18 wherein the substituted ammonium cation contains only alkyl groups.

* * * * *